Sept. 22, 1964 J. TRAKSEL 3,149,600
INTEGRATED PROPULSION AND CONTROL SYSTEM FOR HYDROFOIL CRAFT
Filed Dec. 18, 1961 9 Sheets-Sheet 4

FIG_4

FIG_7

INVENTOR.
JOHAN TRAKSEL
BY
*George A. Sullivan*
Agent

Sept. 22, 1964 J. TRAKSEL 3,149,600
INTEGRATED PROPULSION AND CONTROL SYSTEM FOR HYDROFOIL CRAFT
Filed Dec. 18, 1961 9 Sheets-Sheet 7

FIG_8

INVENTOR.
JOHAN TRAKSEL
BY
*George C. Sullivan*
Agent

FIG_9

FIG_11

Sept. 22, 1964 J. TRAKSEL 3,149,600
INTEGRATED PROPULSION AND CONTROL SYSTEM FOR HYDROFOIL CRAFT
Filed Dec. 18, 1961 9 Sheets-Sheet 9

FIG_10

FIG_12

INVENTOR.
JOHAN TRAKSEL
BY
Agent

United States Patent Office 3,149,600
Patented Sept. 22, 1964

3,149,600
INTEGRATED PROPULSION AND CONTROL
SYSTEM FOR HYDROFOIL CRAFT
Johan Traksel, Chatsworth, Calif., assignor to Lockheed
Aircraft Corporation, Burbank, Calif.
Filed Dec. 18, 1961, Ser. No. 159,927
11 Claims. (Cl. 114—66.5)

This invention relates to an integrated propulsion and control system for a hydrofoil craft and more particularly to a new and improved propulsion system capable of providing a lift force, a lateral control force, a transverse control force, and a roll control coupled for application to a high performance hyrofoil craft having a hull and a plurality of hydrofoils depending fore and aft therefrom for propulsion, steering and control thereof.

As a hydrofoil craft accelerates to its designed point, it operates as a displacement and planing vessel before it achieves "flight" wherein the hull thereof is foilborne. In the first attitude, the lift-drag ratio varies from essentially an infinite value to an order of magnitude of 20. In the planing attitude this ratio drops to values as low as 3 and while foilborne, over-all lift-drag ratios of 2 to 10 are attained depending upon the foil operating attitude, i.e., supercavitating or subcavitating.

In any lifting system where lift is obtained at the expense of a drag penalty, maximum performance is obtained for a given thrust by vectoring the thrust so as to supply some of the lift directly. Evaluation of the equilibrium equations of motion indicates that the proper vector angle is a function of the inverse of the lift-drag ratio of the system.

In present systems, directional control is most commonly maintained by a submerged rudder whose effectiveness is a function of control surface area and the dynamic pressure of the medium. As is the case with its aerodynamic counterpart, rudder effectiveness is very low at low velocity and at low density. For the hydrofoil craft this corresponds to operation in the low speed displacement regime and within the cavity of the supercavitating regime. Considering the wide range of lift-drag ratios noted above and the ineffectiveness of the hyrodynamic directional control surface at both ends of the velocity range, it is an object of this invention to provide a new and improved directional control system capable of varying the thrust vector to provide the desired vertical and transverse forces.

It is another object of this invention to provide a thrust vectoring system for application to high-speed hydrofoil crafts which is capable of providing a continuous variation of the transverse control force in conjunction with the desired vertical and axial thrust components.

It is another object of this invention to provide a new and improved directional control system for a hydrofoil craft operating over the entire speed range from hullborne long duration search operation to foilborne high-speed operation.

Yet another object of this invention is to provide a new and improved directional control system for a hydrofoil craft wherein the thrust deflection angle for lift may be predetermined.

It has been found that a submerged rudder, similar to its aerodynamic counterpart, depends upon hydrodynamic forces for the provision of directional control forces, the latter being functions of the density and relative velocity of the fluid medium. Thus, at the low speed associated with long duration search operations, a rudder is relatively ineffective. Further, at the speeds associated with the operation of craft equipped with supercavitating hydrofoils, a rudder incorporated into a hydrofoil-supporting strut loses its effectiveness because of its location within the cavity formed by the hydrofoil. Control may be obtained by relocating the rudder outside the cavity. However, this would require an additional strut with an associated drag penalty. Thus, at these high speed conditions, it would be more desirable and, therefor, another object of this invention to provide new and improved directional control forces fora hydrofoil craft which provides means for vectoring the thrust of the main propulsion system.

This invention provides a composite nozzle system which overcomes disadvantages of prior means and methods heretofore intended to accomplish generally similar purposes and which is advantageous in the above noted methods when the deflection of the fluid jet, such as the exhaust gases of a turbojet or a turbofan engine, or a water pump jet, exceeds approximately 10°.

This invention further provides separate nozzles extending transversely from the hull of the craft in which the nozzle assembly is rotated about an appropriate axis to provide transverse force and which in addition, incorporates vanes to deflect the flow and to promote a vertical component, the vanes also acting as closure doors.

In determining the optimum location of the thrust vector, the effect of the thrust component shall be individually evaluated. The axial component of a given thrust vector provides the same acceleration capability at any location. However, when it is located at some vertical distance from the center of forces, there is an associated moment which must be counteracted by a change in foil lift distribution. A similar effect is attributable to the vertical component of the thrust vector when located at some axial distance from the center of forces. It has been found that the most desirable location of the thrust vector is such that it passes through the transverse axes of the center of forces so that no extraneous moments about this axis are introduced. The location of the transverse component applied for directional control effect both the turning radius and the coordination of the maneuver. When the force is applied aft of the center of forces, it must act outwardly from the center of rotation to produce the desired moment. This distracts from the centripetal force, created by the foils, resulting in a larger turning radius. In addition, application of this force above the center of forces produces an undesirable heeling moment and, to make a coordinated turn, the required heeling moment produced by the foils must increase. When the force is applied forward of the center of forces, it must act toward the center of rotation, supplementing the centripetal force and decreasing the turning radius. When this force is applied above the center of forces, it produces a desirable heeling moment reducing the moment required of the foils.

It is therefore another object of this invention to provide a new and improved directional control system for a hydrofoil craft in which the thrust vector is above and forward of the center of forces.

Another object of this invention is to provide a means for controlling the roll attitude of the hydrofoil craft.

A general object of this invention is to provide a new and improved integrated control system for a hydrofoil craft which is capable of directly providing a portion of the lift and which overcomes disadvantages of prior means and methods heretofore intended to accomplish generally similar purposes.

These and other objects of this invention will be more apparent from the following detailed description, drawings and appended claims.

Referring in detail to the drawings, and more particularly to FIGURES 1–8, inclusive, there is shown by way of illustration, but not of limitation, a preferred embodiment of an integrated control system for a hydrofoil craft designed and constructed in accordance with this invention and generally designated by the numeral 10. In accordance with this invention, the integrated control system 10 is herein illustrated as applied to a hydrofoil craft generally designated by the number 11 and including a hull 12 having forward and aft hydrofoils 13 and 14, respectively, extending from the hull for supporting the hull in elevated relationship to the water line of a body of water during operation of the craft in the foilborne speed regime. The integrated control system 10 includes a pair of jet nozzles 16 and 17 extending transversely from a forward portion of the hull for providing transverse, vertical and axial thrust to the hull for lifting the hull to the foilborne, for propelling the hull in each of its attitudes of displacement, planing and foilborne conditions for attitude control and for steering the craft.

In both hydrodynamic and aerodynamic types of jet propulsion systems, directional control and lift contribution can be provided by incorporation of swivelling nozzles 16 and 17 or optionally by movable vertical and horizontal vanes located at the nozzle exit. A composite nozzle system is most desirable when the required jet deflection exceeds approximately 10°. The nozzle system, illustrated and described in connection with FIGURES 1–8, inclusive, utilizes rotation of the nozzle assembly about an appropriate axis to provide the transverse force and incorporates vanes, as will be hereinafter described, to deflect the flow and promote a vertical component and to provide a force complete around the lateral axis. These vanes also act as closure doors.

In the modified nozzle system, as shown schematically in FIGURES 9–11, separate nozlzes for the transverse thrust and for the axial flow are provided, as will be herein after described. The area apportionment in this system is such that the total eeffctive flow area is constant over the complete range of the flow distribution from zero side force to maximum side force.

Figure 1:
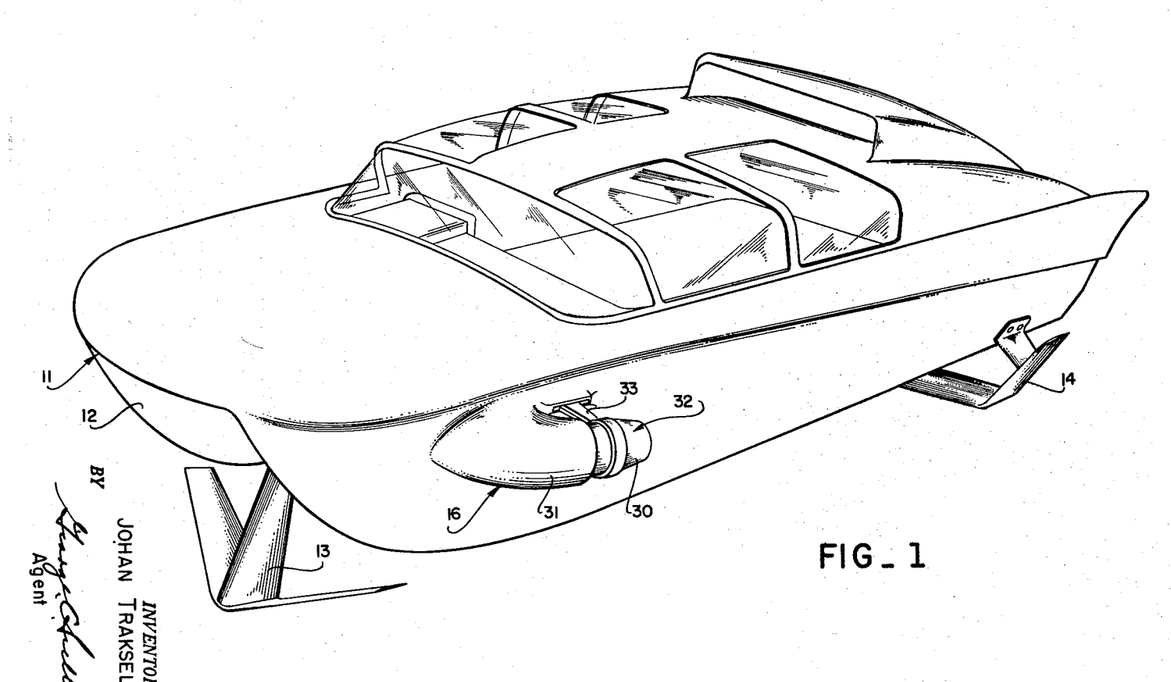
FIGURE 1 is a perspective view, in elevation, of a hyrofoil craft incorporating the directional control system of this invention.
Figure 2:
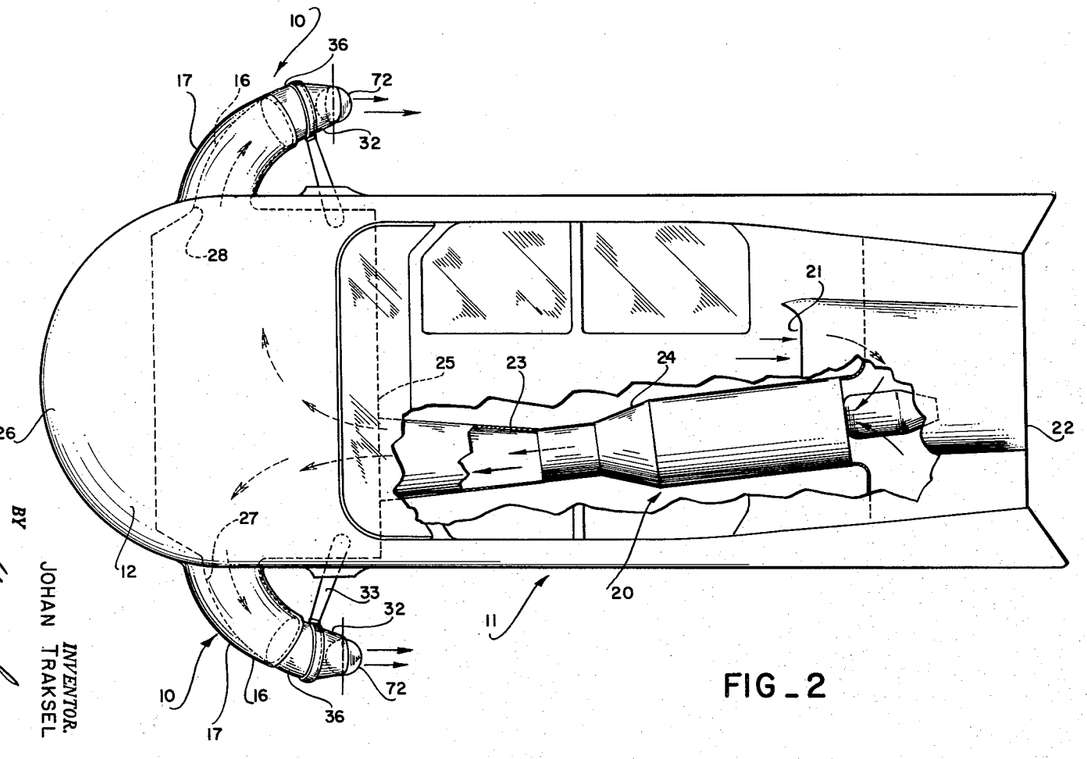
FIGURE 2 is a top plan view thereof with parts broken away for greater clarity.
Figure 3:
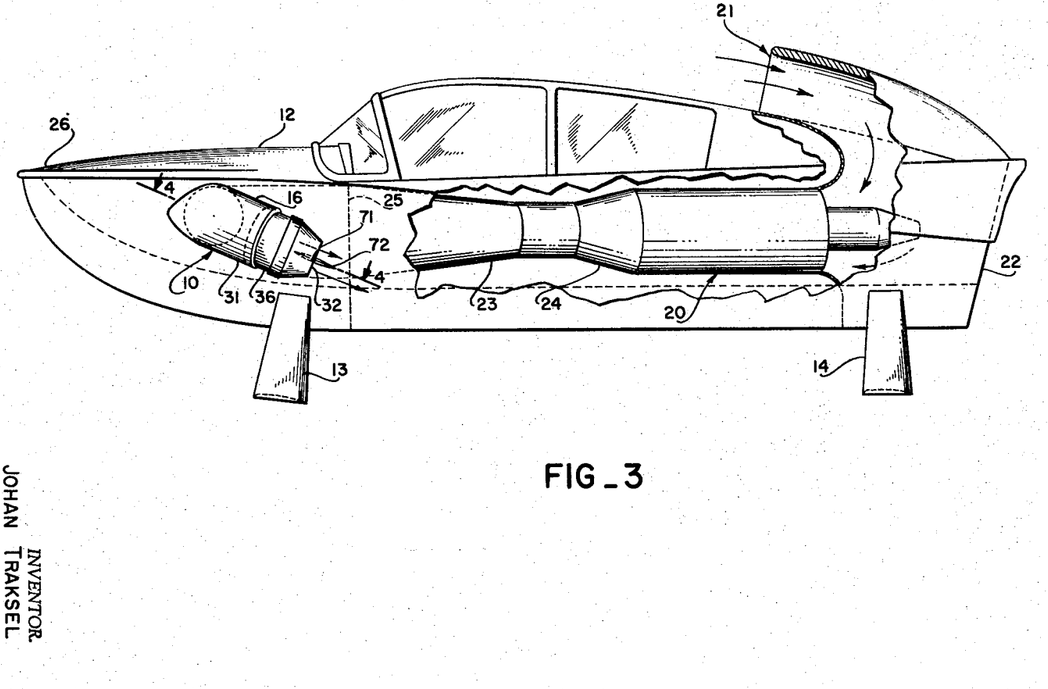
FIGURE 3 is a side view, in elevation, thereof, with parts broken away for greater clarity.

Both modifications will be shown and described herein as receiving an exhaust flow of fluid as an example from a turbojet or a turbofan type of engine generally designated by the numeral 20 and substantially axially mounted in the hull 12, the engine 20 being arranged, as best seen in FIGURES 2 and 3, to have an air scoop 21 adjacent to the stern 22 of the boat and is provided with a duct 23 communicating between the exhaust 24 of the engine 20 and an air plenum 25 located adjacent to the bow 26 of the hull 12. The plenum 25 extends transversely of the hull 12 and is provided wtih opposed outlets 27 and 28 communicating with the opposed jet nozzles 16 and 17, respectively, through which exhaust gases exit, providing an axial, vertical and transverse thrust to the hull having a predetermined and variable thrust vector and, if required, a force coupled around the lateral axis.

Figure 8:
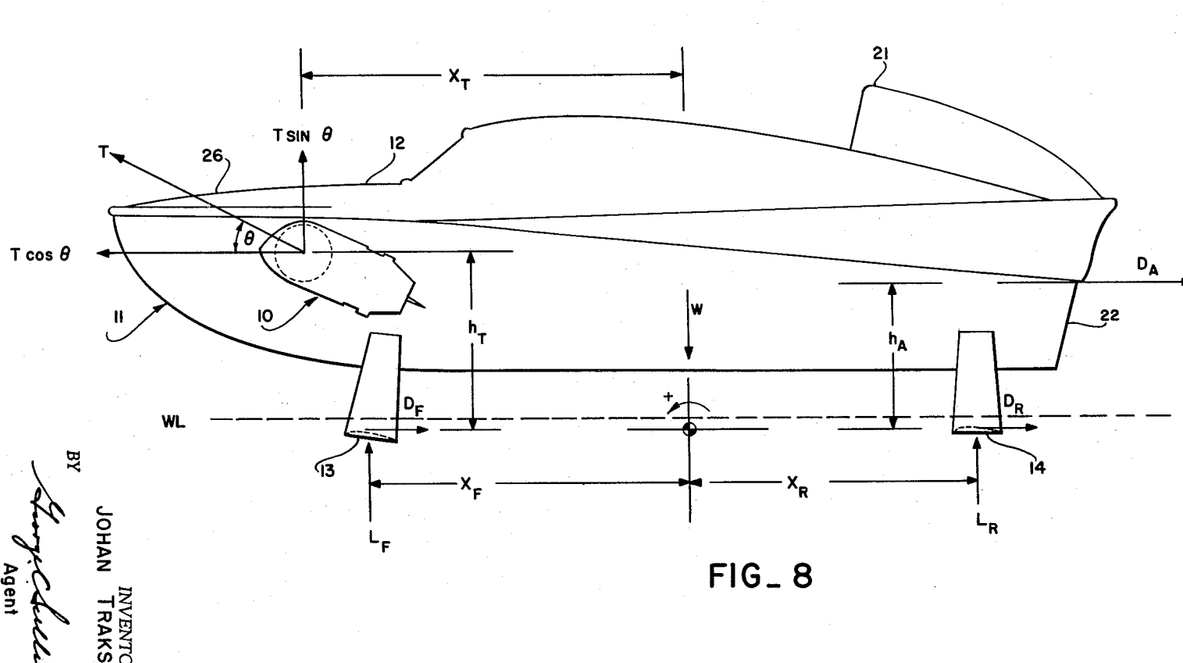
FIGURE 8 is a diagrammatic view of the hydrofoil craft showing the vector of the thrusts obtained as a result of adapting the craft to the means of this invention.

If any lifting system where lift is obtained with an associated drag, maximum performance is obtained for a given thrust by vectoring the thrust so as to supply some of the lift directly. The proper thrust deflection angle may be determined as follows: Considering the configuration illustrated schematically in FIGURE 8, the thrust vector has been arbitrarily placed as shown. It may, however, be at any pertinent location to exemplify a marine propeller, a hydrodynamic jet or aerodynamic thrust system. The equilibrium equations of motion are general and the signs of various moment arms will vary in accordance with the disposition of the vector. The equilibrium equations of motion for foilborne operation are:

$$L_r + L_f + T \sin \theta = W \quad (1)$$

$$T \cos \theta = D_r + D_f + D_a \quad (2)$$

$$L_r X_r + T \cos \theta h_t = L_f X_f + T \sin \theta X_t + D_a h_a \quad (3)$$

where $W$ = weight of craft
$T$ = nozzle thrust
$L_r$ = rear foil lift
$L_f$ = front foil lift
$D_r$ = rear foil and strut drag
$D_f$ = front foil and strut drag
$D_a$ = aerodynamic drag
$X_r$ = moment arm to $L_r$ about center of forces
$X_f$ = moment arm to $L_f$ about center of forces
$X_t$ = moment arm to $T \sin \theta$ about center of forces
$h_t$ = moment arm to $T \cos \theta$ about center of forces
$h_a$ = moment arm to $D_a$ about center of forces The foil and strut drags act essentially through the hydrodynamic center of forces and do not affect the amount equation about the transverse axis as shown in FIGURE 8. With the thrust at some arbitrary angle ($\theta$) from the horizontal, the equilibrium of vertical and horizontal forces, Equations 1 and 2, can be simplified as $$L_{total} + T \sin \theta = W$$

$$T \cos \theta = D_{total}$$

Thus $$(L/D)_{total} = \frac{W - T \sin \theta}{T \cos \theta} \quad (4)$$

If it may be assumed that $(L/D)_{total}$ remains constant for the variation in lift associated with thrust vectoring, Equation 4 can be written in the form $$a(T/W) \cos \theta = 1 - (T/W) \sin \theta$$

where $$a = \text{constant } (L/D) \quad (5)$$

The minimum thrust required at a given weight can be determined by taking the total derivative of (T/W) with respect to $\theta$ and equating it to zero.
This leads to an expression in the form $$a \sin \theta = \cos \theta$$

from which it is seen that $$\tan \theta = D/L$$

It may also be shown that if (L/D) is not constant but is a linear function in the range of interest, the optimum efflux angle from a minimum thrust standpoint is a function of the slope of the lift-drag relationship.

In determining location of the thrust vector, the effect of the thrust component shall be individually evaluated. The axial component of a given thrust vector provides the same acceleration capability at any location. However, when it is located at some vertical distance from the center of forces, there is an associated moment which must be counteracted by a change in foil lift distribution. A similar effect is attributable to the vertical component of the thrust vector when located at some axial distance from the center of forces. From the requirement that Equation 3 be satisfied, it is seen that the most desirable location of the thrust vector is such that it passes through the transverse axis of the center of forces so that no extraneous moments about this axis are introduced. The location of the transverse component applied for directional control affects both the turning radius and the coordination of the maneuver. When the force is applied aft of the center of forces, it must act outward from the center of rotation to produce the desired moment. This detracts from the centripetal force resulting in a larger turning radius. In addition, application of this force above the center of forces produces an undesirable heeling moment and, to make a coordinated turn, the required heeling moment produced by the foils must increase. When the force is applied forward of the center of forces, it must act toward the center of rotation, supplementing the centripetal force and decreasing the turning radius. When this force is applied above the center of forces, it produces a desirable heeling moment reducing the moment required of the foils.

From the above, it may be concluded that the most desirable location for the thrust vector is above and forward of the center of forces, with the propulsive force divided between two or more nozzles such that a rolling couple can conveniently be obtained, essentially as shown in FIGURES 2 and 8. This configuration is therefore herein described and subsequently claimed as a part of this invention, per se.

Figure 4:
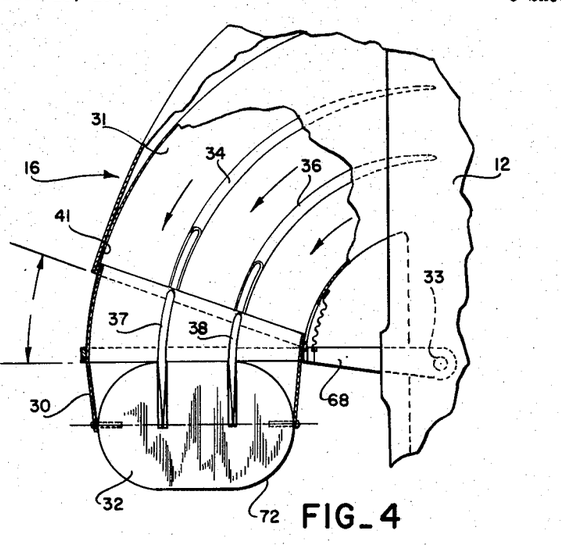
FIGURE 4 is a fragmentary, cross-sectional view as taken substantially along the line 4—4 of FIGURE 3.

As best seen in FIGURES 2, 3 and 4, each nozzle 16 and 17 is provided with a nozzle exit 30 which is pivotable relative to an arcuate fixed portion 31 connected to the outlets 27 and 28 of the plenum 25 for improved directional control of the thrust force emitting from the exit 32. The nozzle portion 30 is rotatable about a vertical axis 33 so as to telescopically move relative to the curved portion 31 for thrust deflection in a plane parallel to the plane line designated as 4—4 in FIGURE 3. The portion 31 preferably includes a pair of fixed splitters 34 and 36 which are radially arranged relative to the pivot point 33 and aligned with complementary movable splitters 37 and 38, respectively, which are fixed in relationship to the pivotable section 30 for assisting in directing the flow through the nozzle members 16 and 17. The portion 30 is rotatable relative to the portion 31 by the nozzle deflection angle indicated at 39. The sections 30 are sealed relative to the sections 31 by resilient seal members 41 located between the movable member 30 and the fixed member 31 (see FIGURE 4).

Figure 5:
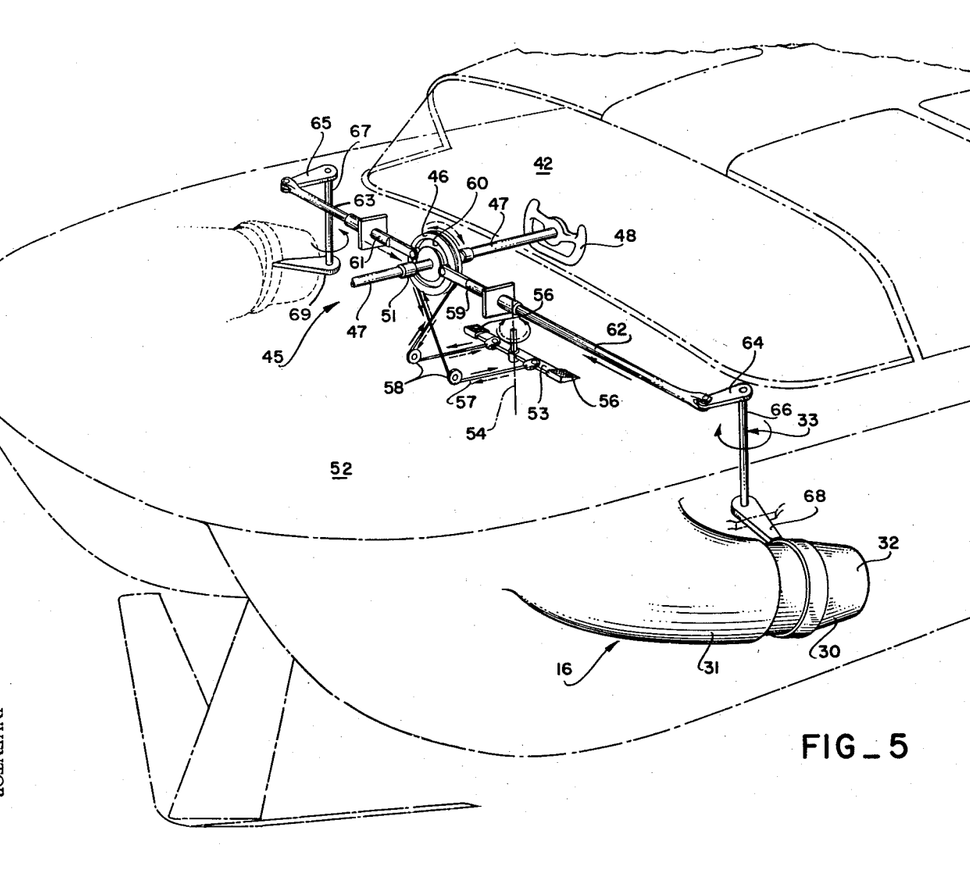
FIGURE 5 is a diagrammatic view, in perspective, of the craft of this invention schematically showing structure thereof associated with the directional control of the hydrofoil craft.

Remote controls are preferably provided and actuatable by the pilot of the craft from the cockpit 42 adjacent to the engine 20 for actuating movement of the nozzle portion 30 relative to the fixed portion 31. As best seen in FIGURE 5, the remote control, generally designated by the numeral 45, includes a member 46 rotatably supported on a control shaft 47 having a steering wheel 48 operable by the pilot. The rotatable member 46 is freely rotatable on the shaft 47 which is reciprocable in bearings 51 fixed as to the underside of the forward deck 52 of the craft in any suitable manner. The rotatable member 46 is rotatable in response to actuation of a foot pedal control 53 including an elongated transverse rod pivotable about a vertical axis 54 and having foot pedals 56.

An endless cable 57 extending over pulleys 58 and around the rotatable member 46 is provided for rotating the rotatable member 46 in response to actuation of the foot pedals 56. The rotatable member 46 is connected by rollers 59 and 61 to a pair of opposed push-pull rods 62 and 63, respectively, which, through levers 64 and 65, are fixed to rotate vertical shafts 66 and 67 comprising the vertical axis 33. The shafts 66 and 67 are connected to opposed arms 68 and 69 each respectively connected to a movable nozzle portion 30 of the nozzles 16 and 17, respectively, for independently swivelling the nozzle portions 30 about the vertical axes of rotation 33 relative to the fixed portion 31 thereby to vary the angle of nozzle deflection of the nozzles for directional control.

The member 46 includes a cam slot 60 in which the roller 59 and 61 roll. The cam slot 60 includes a circular portion on one side of its transverse axis and an elliptical portion on the other side of the transverse axis. In this manner, when the member 46 is rotated, by the foot pedals 56, one roller follows in the circular portion of the slot 60 while the other follows in the elliptical portion of the slot 60. In response the one rod connected to the roller following the circular portion is stationary while the other rod having its roller following in the elliptical slot is pulled to swivel the nozzle connected thereto outwardly, away from the hull. Conversely, rotation of the member 46 in a reverse direction causes the swiveled nozzle to return and be held in its normal rearwardly directed position while the opposite nozzle is swiveled outwardly. By this means, the nozzles direct the direction of the thrust relative to the hull.

Figure 6:
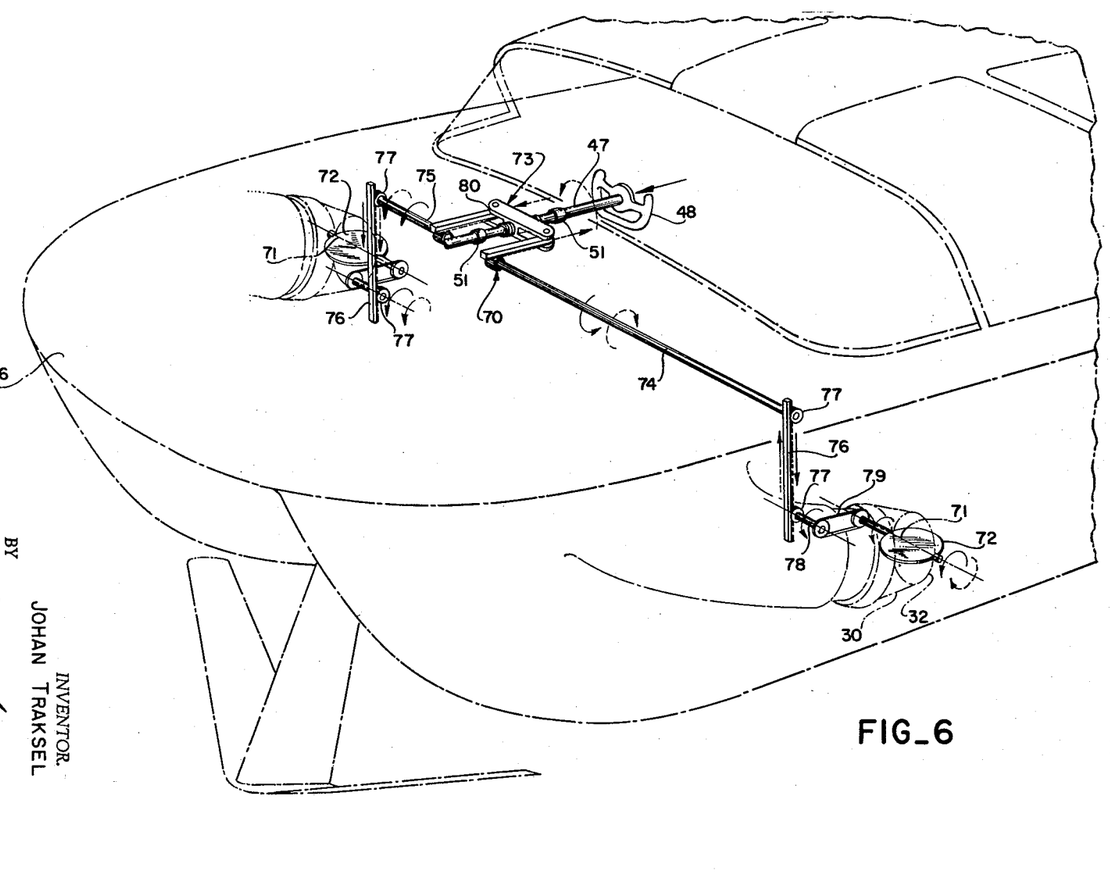
FIGURE 6 is a diagrammatic view, similar to FIGURE 5, schematically illustrating the mechanism associated with a pitch and roll control of the integrated control system of this invention.
Figure 7:
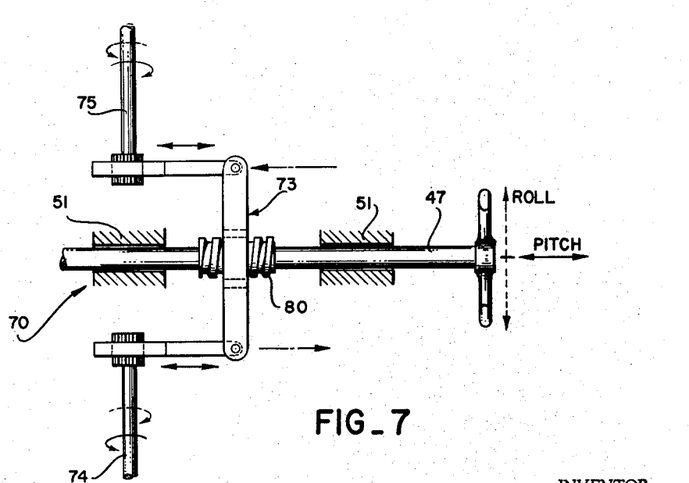
FIGURE 7 is a fragmentary, diagrammatic plan view of the mechanism of FIGURE 6.

The shaft 47, connected to the steering wheel 48, is reciprocable within the bearings 51 (see FIGURE 7) for actuating the pitch control of the nozzles 16 and 17. The pitch control comprises, as best seen in FIGURES 3 and 6, a mechanism 70 adapted to translate the linear reciprocable movement of the shaft 47 into a rotation of a shaft 71 rotatably supporting a flap 72 adjacent to the exit opening 32 of each of the nozzle portions 30. The mechanism 70 includes means 73 for translating the reciprocable movement of the shaft 47 into a simultaneous opposed rotation of transverse shafts 74 and 75 which, in turn, as described for one flap 72 through rack and pinions 76 and 77, respectively, rotate a horizontal shaft 78 which is connected by a cable or belt 79 to rotate the shaft 71 to rotate the flap 72 relative to the exit 32 thereby selectively opening and closing or adjusting the area of the opening 32. In this manner, the pitch of the thrust forces is controlled by the mechanism 70 for either directing the bow 26 of the hull 12 downwardly in response to pushing of the shaft 47 towards the bow 26 and upwardly in response to pulling back of the shaft 47.

The roll control is also incorporated in the vanes 71 and the mechanism 70 used to operate the vanes 71 so as to affect the vanes to control roll forces on the hull about the lateral axis of the hull. For this purpose the mechanism 70 includes a connection 80 responsive to rotation of the shaft 47 for rotating the shafts 74 and 75 in opposite directions so as to actuate the flaps 72 in opposite nozzles to rotate in opposite direction around their respective axes of rotation 71.

Therefore, when the steering wheel is axially pushed or pulled the shaft 47 causes the flaps 72 to rotate up or down together to control the pitch of the hull and the lifting force. When the steering wheel is rotated, in any selected axial position, however, the flaps are rotated in opposite directions to control the roll of the hull.

Figure 9:
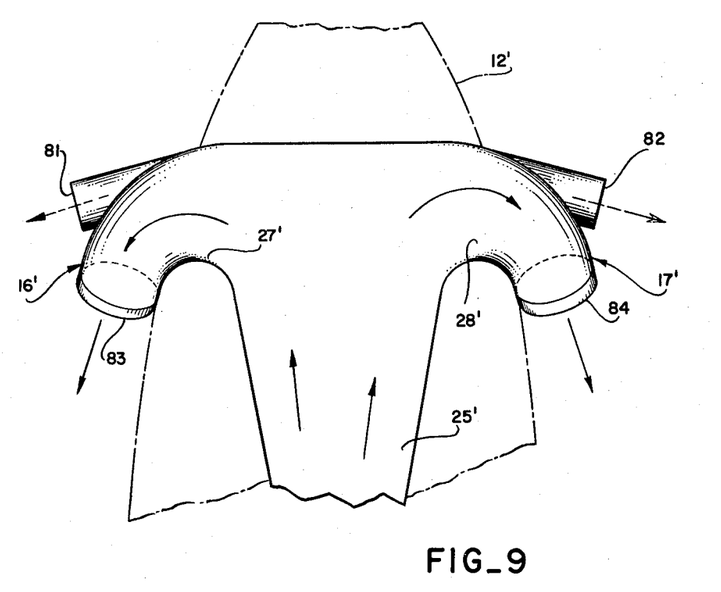
FIGURE 9 is a diagrammatic view of a modified embodiment of this invention.
Figure 10:
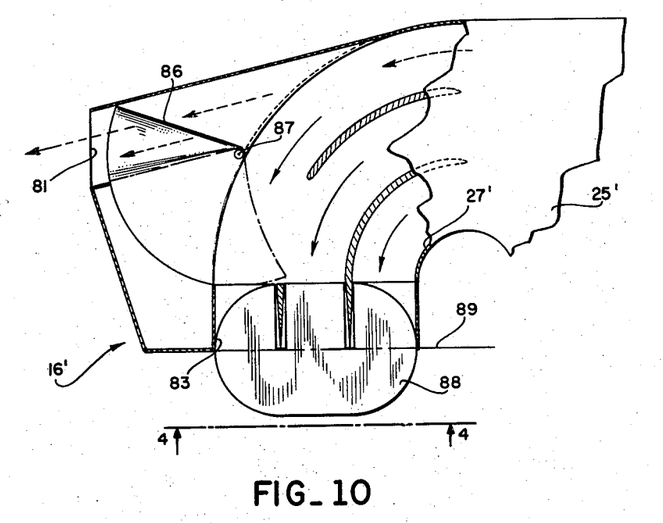
FIGURE 10 is an enlarged horizontal, cross-sectional view showing the embodiment of FIGURE 9 in greater detail.
Figure 11:
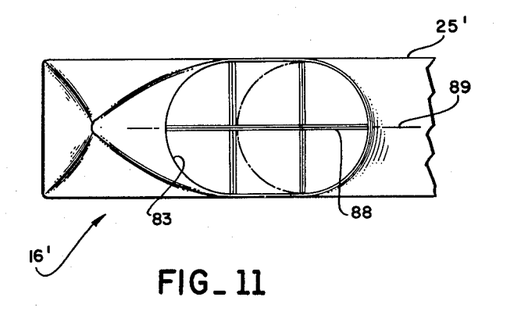
FIGURE 11 is an end view as viewed along line 11—11 of FIGURE 10.
Figure 12:
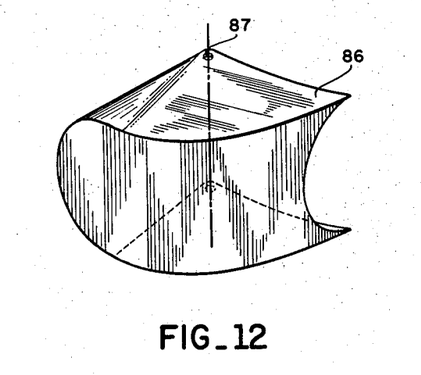
FIGURE 12 is a perspective view of the value body configuration employed in the exhaust system of FIGURE 10.

Referring more particularly to FIGURES 9–11, inclusive, a modified embodiment of this invention, as previously referred to, is shown which includes separate nozzles on each jet nozzle 16' and 17' extending outwardly from a hull 12', similar to the first embodiment. Each nozzle 16' and 17' has separate transverse exit openings 81 and 82, respectively, and axial thrust openings 83 and 84. In the instant embodiment, the transverse nozzles 81 and 82 are provided for providing a transverse thrust to the hull 12'. The openings of the transverse thrust nozzles 81 and 82 are controlled by the provision of a valve 86 pivotable about a transverse axis 87 for varying the thrust of the nozzles. FIGURE 12 illustrates the valve body configuration. The axial thrust nozzles 83 and 84 are provided with valve flaps 88 pivotable about a horizontal axis of rotation designated by the numeral 89 for closing and opening the thrust nozzles 83 and 84. The flaps 88 may be controlled by a mechanism similar to the mechanism 70 previously described in the first embodiment whereas the flaps 86 may be controlled by a mechanism similar to the mechanism 45 of the first embodiment.

The flap members 88 and 89 of the instant embodiment and the flap members 72 of the first embodiment are further useful for keeping foreign matter out of the nozzles like 16 and 17, such as water, when the craft 12 is hullborne on relatively rough water.

The nozzle members 16' and 17' communicate with outlets 27' and 28', respectively, similar to the outlet of the plenum 25 and communicate with a plenum 25' receiving exhaust gases from a turbojet, turbofan engine or water jet engine, similar to the engine 20 of the first embodiment. In all other respects both embodiments are identical and similar parts thereof are identified by similar numerals which are primed.

In both embodiments, the location of the thrust vector is determined as previously described for effecting a most efficient directional control for a jet propelled hydrofoil craft.

While there is herein shown and described what is conceived to be the most practical and preferred embodiments of this invention, it is recognized that departures may be made therefrom within the scope of this invention which is not limited to the details disclosed herein but is to be accorded the full scope of the claims so as to embrace any and all equivalent devices.

What is claimed as new and desired to secure by Letters Patent is:

1. A control device for a hydrofoil craft having a hull, a plurality of fore and aft hydrofoils depending therefrom, and a jet engine power system within said hull, comprising:
   (a) a rearwardly and downwardly oriented nozzle member on each side of said hull, and communicating with said jet engine power system to receive the exhaust gases therefrom so that said gases are exhausted through said nozzle members in a generally rearward and downward direction;
   (b) said nozzle members being disposed on said hull at a point substantially forward of and above the center of forces of said craft, and being aligned so that during cruising operation of the craft the normal thrust vector of said exhaust gases from said nozzles will normally pass approximately through the transverse axis of the center of forces; and
   (c) said nozzles having movable means associated therewith for selectively varying the direction of said vector in both the horizontal and vertical directions.

2. The control device for a hydrofoil craft as set forth in claim 1, wherein said movable means includes a nozzle which has a movable tubular exit section through which gases are expelled and which is moved about a substantially vertical axis to vary the lateral direction of said thrust vector with respect to the longitudinal axis of said hull to thereby control steering of the hydrofoil craft.

3. The control device for a hydrofoil craft as set forth in claim 1, wherein said movable means includes a flap member which is pivoted on a substantially horizontal axis adjacent the end of said nozzle members to provide for control of pitch and of roll of said hydrofoil craft.

4. The control device for a hydrofoil craft as set forth in claim 1, wherein said movable means includes a tubular exit section at the end of said nozzle through which gases are expelled and which is pivotable about a given axis, and a flap member pivoted about an axis disposed transverse to said given axis and which is adjacent the end of said exit section.

5. The control device for a hydrofoil craft as set forth in claim 1, wherein a plenum chamber is connected to said jet engine power system, and said nozzle members are each connected to said plenum chamber.

6. A control device for a hydrofoil craft having a hull, a plurality of fore and aft hydrofoils depending therefrom, and a jet engine power system within said hull, comprising:
   (a) a rearwardly and downwardly oriented nozzle member on each side of said hull, and communicating with said jet engine to receive the exhaust gases therefrom so that said gases are exhausted through said nozzle members in a generally rearward and downward direction;
   (b) said nozzle members being disposed on said hull at a point substantially forward of and above the center of forces of said craft, and being aligned so that during cruising operation of the craft the thrust vector of said exhaust gases from said nozzles will normally pass approximately through the transverse axis of the center of forces;
   (c) said nozzle members each having a flap member pivoted adjacent the end thereof on a substantially horizontal axis; and
   (d) roll control means connected to said flaps for simultaneously pivoting the flap of one nozzle in one direction and the flap of the other nozzle in the opposite direction.

7. A control device for a hydrofoil craft having a hull, a plurality of fore and aft hydrofoils depending therefrom, and a jet engine power system within said hull, comprising:
   (a) a rearwardly and downwardly oriented nozzle member on each side of said hull, and communicating with said jet engine power system to receive the exhaust gases therefrom so that said gases are exhausted through said nozzle members in a generally rearward and downward direction;
   (b) said nozzle members being disposed on said hull at a point substantially forward of and above the center of forces of said craft, and being aligned so that during cruising operation of the craft the thrust vector of said exhaust gases from said nozzles will normally pass approximately through the transverse axis of the center of forces;
   (c) said nozzle members each having a tubular duct fixed at one end to said hull and in relatively movable telescopic engagement at its other end with a tubular exit section; and
   (d) a linkage means connected to said exit section for moving said exit section in a transverse direction to direct exhaust gases outwardly and away from said hull to thereby provide for steering of said craft.

8. A control device for a hydrofoil craft having a hull, a plurality of fore and aft hydrofoils depending therefrom, and a jet engine power system within said hull, comprising:
   (a) a rearwardly and downwardly oriented nozzle member on each side of said hull, and communicating with said jet engine power system to receive the exhaust gases therefrom so that said gases are exhausted through said nozzle members in a generally rearward and downward direction;
   (b) said nozzle members being disposed on said hull at a point substantially forward of and above the center of forces of said craft, and being aligned so that during crusing operation of the craft the thrust vector of said exhaust gases from said nozzles will normally pass approximately through the transverse axis of the center of forces;
   (c) a flap member pivotably supported on the end of each of said nozzle members adjacent the open end thereof on a generally horizontal axis, said flap having approximately the same shape and of slightly smaller dimension than that of said open end of said nozzle members; and (d) linkage means connected to said flap for pivoting it about said axis so that exhaust gases from said nozzle members are deflected upwardly or downwardly and said flap may also be positioned to close off said open end of said nozzle members.

9. The control device for a hydrofoil craft as set forth in claim 8, wherein said flap members are connected to a second linkage means which simultaneously pivots said flap members in opposite direction.

10. A control device for a hydrofoil craft having a hull, a plurality of fore and aft hydrofoils depending therefrom, and a jet engine power system within said hull, comprising:
   (a) a rearwardly and downwardly oriented nozzle member on each side of said hull, and communicating with said jet engine power system to receive the exhaust gases therefrom so that said gases are exhausted through said nozzle members in a generally rearward and downward direction;
   (b) said nozzle members being disposed on said hull at a point substantially forward of and above the center of forces of said craft, and being aligned so that during normal crusing operation of the craft the thrust vector of said exhaust gases from said nozzles will normally pass approximately through the transverse axis of the center of forces;
   (c) a separate transverse exit opening on the outward side of said nozzle members through which exhaust gas is released to thereby impart a transverse thrust to said hull; and
   (d) a pivoted valve member on said nozzle members which is selectively moved to vary the size of said transverse exit opening to thereby control the transverse thrust which is applied to said hull.

11. A hydrofoil craft, comprising:
   (a) a hull having a plurality of fore and aft hydrofoils depending therefrom;
   (b) an air scoop disposed adjacent the stern of said hull and having its intake side facing the bow of said hull;
   (c) a jet engine power system mounted on said hull with the intake section thereof facing the stern of said hull and connected to said air scoop;
   (d) a rearwardly and downwardly oriented nozzle member on each side of said hull, and communicating with said jet engine power system to receive the exhaust gases therefrom so that said gases are exhausted through said nozzle members in a generally rearward and downward direction;
   (e) said nozzle members being disposed on said hull at a point substantially forward of and above the center of forces of said craft, and being aligned so that during crusing operation of the craft the thrust vector of said exhaust gases from said nozzles will normally pass approximately through the transverse axis of the center of forces.

References Cited in the file of this patent

UNITED STATES PATENTS

| | | |
|---|---|---|
| 1,838,354 | Bauer | Dec. 29, 1931 |
| 2,024,274 | Campini | Dec. 17, 1935 |
| 2,667,185 | Beavers | Jan. 26, 1954 |
| 2,708,894 | Hook | May 24, 1955 |
| 2,762,584 | Price | Sept. 11, 1956 |
| 2,912,188 | Singlemann et al. | Nov. 10, 1959 |
| 2,919,546 | David | Jan. 5, 1960 |
| 2,933,891 | Britt | Apr. 26, 1960 |
| 2,961,198 | Stevens | Nov. 22, 1960 |
| 2,980,047 | Korganoff et al. | Apr. 18, 1961 |

FOREIGN PATENTS

| | | |
|---|---|---|
| 710,207 | Great Britain | June 9, 1954 |